(No Model.) 2 Sheets—Sheet 2.
T. KENNEDY & T. SLATTERY.
BUTCHERING APPLIANCE.
No. 570,025. Patented Oct. 27, 1896.
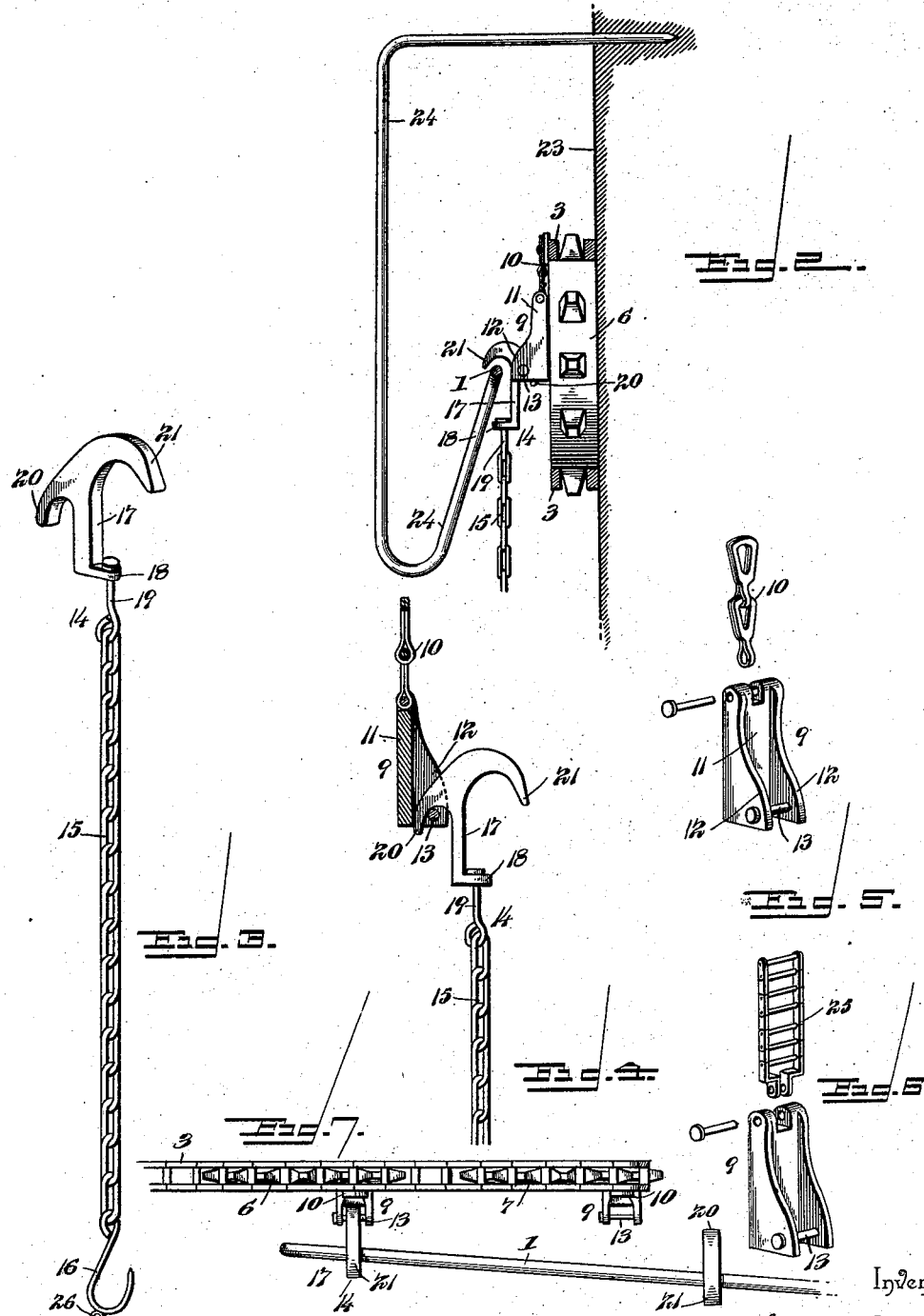
Witnesses
E. K. Stewart
V. B. Hillyard
Inventors
Thomas Kennedy
Thomas Slattery
By their Attorneys, C. A. Snow & Co.

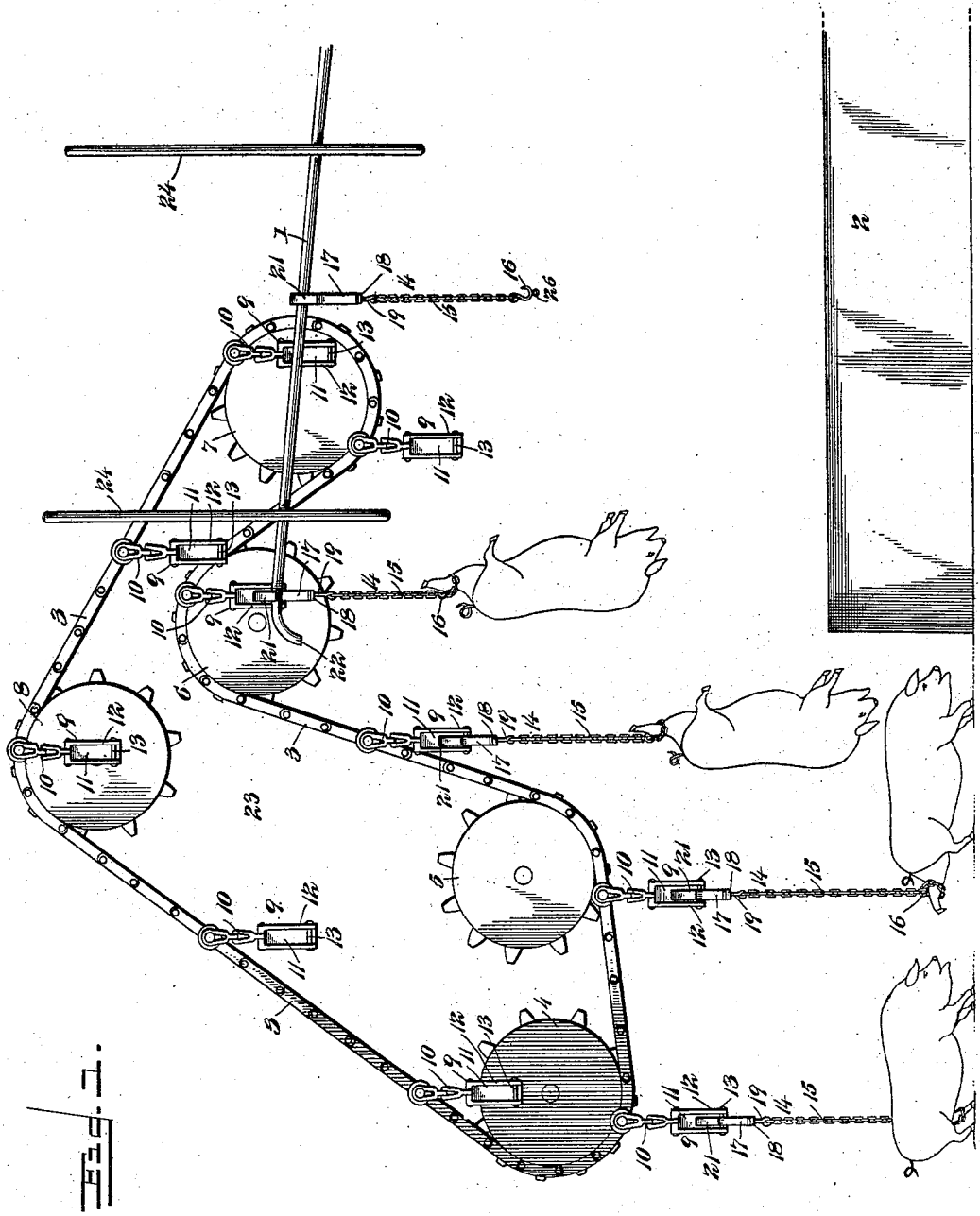

UNITED STATES PATENT OFFICE.

THOMAS KENNEDY AND THOMAS SLATTERY, OF CHICAGO, ILLINOIS.

BUTCHERING APPLIANCE.

SPECIFICATION forming part of Letters Patent No. 570,025, dated October 27, 1896.

Application filed December 5, 1895. Serial No. 571,171. (No model.)

*To all whom it may concern:*

Be it known that we, THOMAS KENNEDY and THOMAS SLATTERY, citizens of the United States, residing at Chicago, in the county of Cook and State of Illinois, have invented a new and useful Butchering Appliance, of which the following is a specification.

This invention relates to butchering appliances, and particularly to such as are designed to facilitate the slaughtering of hogs, and aims to expedite the work and obviate injury to the hogs, which not unfrequently happens by the breaking of the legs, thereby detracting from the marketable value of the hams, besides inflicting unnecessary pain upon the stock.

Other objects and advantages are sought to be attained and will become apparent to those skilled in the art as the invention is disclosed, and to a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 shows the apparatus in operation. Fig. 2 is a detail view showing the manner of transferring the hog from the conveyer to the bar or rod by means of which it is transported to the scalding-tub. Fig. 3 is a detail view of a shackle. Fig. 4 is a detail view showing the shackle and carrier coupled. Fig. 5 is a detail view of the carrier. Fig. 6 shows a different form of chain for connecting the carrier with the conveyer. Fig. 7 is a detail view showing the progressive divergence between the endless carrier and the bar which directs the slaughtered animal to the scalding-tub.

Like numerals of reference denote corresponding parts in all the figures of the drawings, and in which—

1 indicates the bar or rod, by means of which the hog after being slaughtered is directed to the tub of scalding water, (not shown,) and 2 is the trough for receiving the blood during the slaughtering operation.

The endless conveyer 3 is a sprocket-chain, although it is obvious that it may be replaced by a rope or cable, and it is supported by a series of sprocket-wheels 4, 5, 6, 7, and 8, any one of which is positively driven in any convenient way to impart movement to the conveyer. A series of carriers 9 are suspended from the conveyer at regular intervals by means of connections 10, which, as shown, are short lengths of chain. These carriers are arranged at one side of the conveyer so as to clear the several supporting-wheels 4, 5, &c., and are suspended from extensions of the pins employed for coupling the links comprising the endless chain.

The carriers are similarly constructed, and comprise a plate 11 and side flanges 12, the latter gradually widening from the upper to their lower ends and being connected at their lower extremities by means of a transverse pin 13.

The shackles 14 consist of short lengths of chain 15, each having a hook 16 at its lower end and a double hook 17 at its upper end, said hook having a lateral extension 18, which is apertured for the passage of a wire 19, headed at its upper end and having its lower end looped into the topmost link of the chain 15. This wire 19 forms a swivel connection between the chain 15 and the hook 17. The hooks 20 and 21, comprising the double hook 17, face in opposite directions and are located at different elevations, the hook 21 being the larger and disposed in a higher plane than the hook 20, and adapted in the operation of the invention to engage with the rod or bar 1, whereas the hook 20 engages with the transverse pin 13 of the carrier when it is required to couple the shackle thereto. The hook 21, besides serving to engage with the rod or bar 1, presents a convenient means for grasping the shackle when coupling the same to the carrier, as will be readily understood.

The sprocket or supporting wheels 4 and 5 are located a proper distance apart, the wheel 5 being slightly higher than the wheel 4, so as to give an upward and rearward inclination to that portion of the conveyer extending therebetween. The sprocket or supporting wheels 6 and 7 are located considerably higher than the wheel 5, and the wheel 7 is arranged in advance of the wheel 6 and in a slightly lower plane than the same, and the conveyer passes over the sprocket-wheel 6 and beneath the sprocket-wheel 7, thereby assuming an abrupt declination between the two wheels 6 and 7. The sprocket or supporting wheel 8 is located above the wheel 6 and about opposite the space formed between the wheels 5 and 6, thereby causing the portions of the conveyer upon opposite sides thereof to decline, whereby the carriers are caused to ascend until they reach a point directly over the wheel 8, and to descend from this point to the wheel 4.

It will be understood that the several sprocket or supporting wheels are in the same vertical plane with respect to the direction of movement of the conveyer.

The conveyer, in conjunction with the several supporting-wheels, constitutes in effect a hoisting device by means of which the hogs are elevated from the pen to the rod or bar 1, and the pen may be supplied with one or more of these hoisting appliances, according to the capacity of the establishment and the amount of work to be performed.

The operation of the invention is readily comprehended from the foregoing detailed description, but a brief statement as to the manner of using the same may make plain certain features, and to this end the following statement is made: The conveyer is driven so that the carriers on the lower portion thereof travel toward the trough 2, and the hogs, after being shackled, are suspended from the conveyer by coupling the shackles to the carriers in the manner set forth and are advanced toward the trough 2, thence upward, when they are slaughtered, and when the wheel 6 is reached the hog is lowered until the hook 21 engages with the rod or bar 1, when a continued movement of the carrier will disengage the latter from the shackle, leaving the latter in engagement with the rod or bar 1, upon which it slides, carrying the hog to the scalding-tub, (not shown,) as will be readily understood. The declining portion of the conveyer between the wheels 6 and 7 lowers and simultaneously advances the hog, thereby giving it an initial impetus when received upon the bar 1 and insuring the forward movement of the hog to the scalding-tub without requiring the bar 1 to be arranged at too great a pitch. The end of the rod or bar 1 is curved, as shown at 22, to insure the engagement of the hook 21 therewith. The said rod or bar 1 inclines, so that the shackle will slide thereupon, and is supported from the wall or other structure 23 by means of brackets 24 in the usual way.

It is essential that the chain which connects the carrier with the conveyer be flat and broad, so as to prevent its turning and twisting when lying against the pulleys or the side of the conveyer. Any pattern of chain may be used, and, as shown in Fig. 6, the chain 25 is composed of side links and cross-bars.

The hooks 16 have a ring 26 which receives the hook of the hoisting-tackle by means of which the hog is lowered into the scalding-tub. The bar or rod 1 curves outwardly between the pulleys 6 and 7 and opposite the pulley 7 to prevent the swinging carriers from engaging with the hooks of the shackles after the latter have been disconnected from the carriers.

Having thus described the invention, what is claimed as new is—

1. In a butchering appliance of the character set forth, the combination of an endless conveyer provided at intervals in its length with carriers suspended therefrom, a system of supporting-wheels comprising a pair disposed a proper distance apart, the one in a slightly higher plane than the other to give the lower portion of the conveyer a rearward and upward inclination, a second pair disposed in a higher plane and in the rear of the first-mentioned pair, and having the wheels of the second pair properly spaced apart and at different elevations, and having the conveyer passing over the one and beneath the other, and a supporting-wheel arranged in a higher plane than the second pair of supporting-wheels and having the conveyer oppositely inclining therefrom, and shackles adapted to be coupled to the said carriers, substantially as set forth for the purpose described.

2. In a butchering apparatus, the combination of an endless conveyer, a system of supporting and guiding wheels therefor arranged in substantially the same vertical plane but at different elevations and distances apart so as to cause the front part of the lower portion of the conveyer to travel rearwardly and upwardly at a gradual incline, the rear part downwardly and rearwardly at a steep incline, and the intermediate part upwardly and away from the vertical, a rod or bar located to one side of and extending about parallel with the plane of the said system of wheels and conveyer, and having its receiving-terminal just in the rear of the upper part of the lower intermediate portion of the conveyer and its receiving end portion opposite the extremities of the rear lower declining portion of the conveyer, and shackles attached at intervals to the said conveyer and adapted to be transferred to the rod or bar during the forward movement of the said rear lower declining portion of the conveyer, substantially as and for the purpose described.

3. In a butchering apparatus, the combination of an endless conveyer, a rod or bar extending about parallel therewith, carriers pendent from a side of the conveyer by flexible connections, and comprising a plate having tapering and parallel side flanges connected at their lower widened ends by a pin, and a shackle having oppositely-disposed open hooks, the outer hook being disposed to engage with the said rod or bar, and the inner hook engaging with the aforesaid pin of a carrier and entering the space formed between the said pin and the plate, substantially as shown and described.

In testimony that we claim the foregoing as our own we have hereto affixed our signatures in the presence of two witnesses.

THOMAS KENNEDY.
THOMAS SLATTERY.

Witnesses:
WM. HEFFERNAN,
JAMES F. COOK.